(No Model.) 8 Sheets—Sheet 1.
J. J. KOCH & V. THEN.
BRICK MACHINE.
No. 351,780. Patented Nov. 2, 1886.
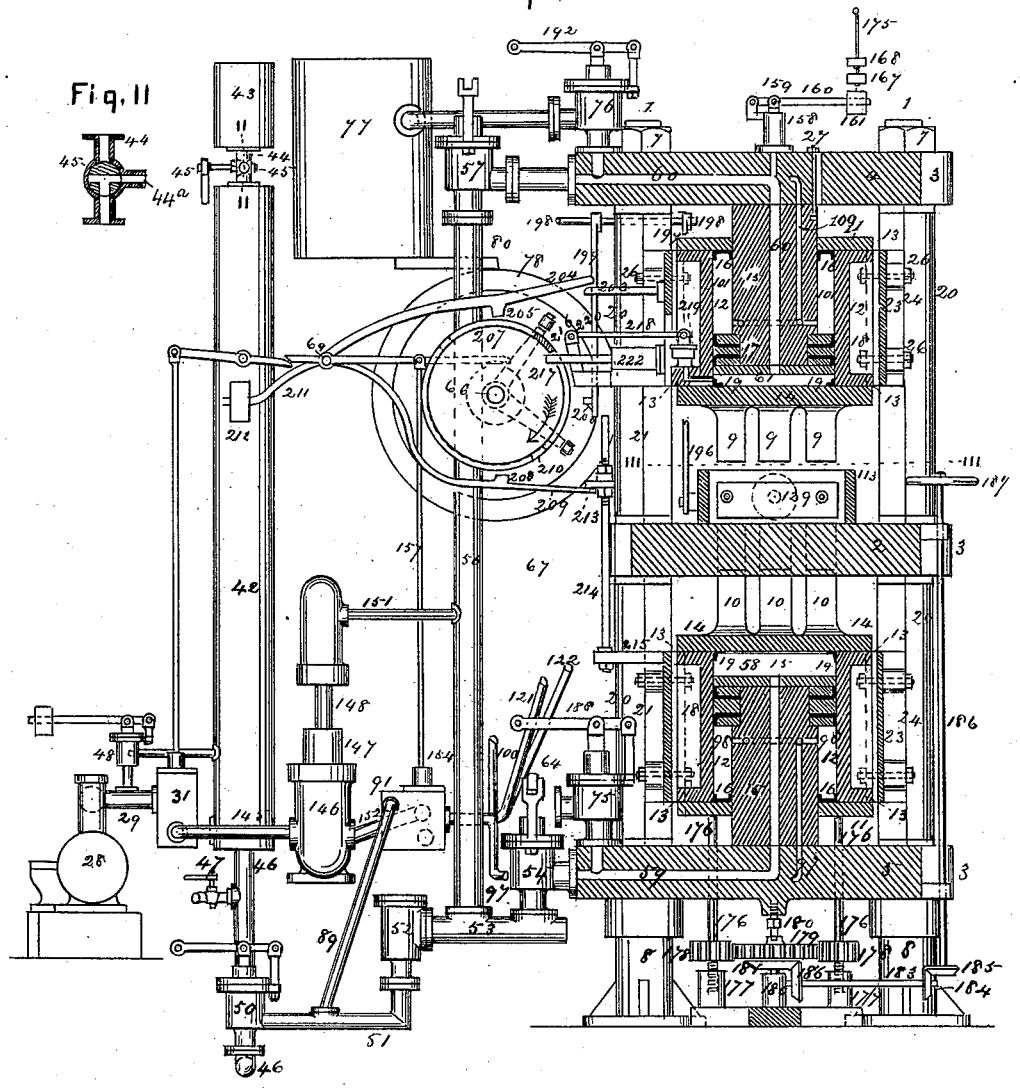
ATTEST,
Geo L Wheelock
Samuel Knight.
INVENTORS,
Julius J. Koch
Valentine Then
By Knight Bros.
Attys.

(No Model.) 8 Sheets—Sheet 2.
J. J. KOCH & V. THEN.
BRICK MACHINE.
No. 351,780. Patented Nov. 2, 1886.
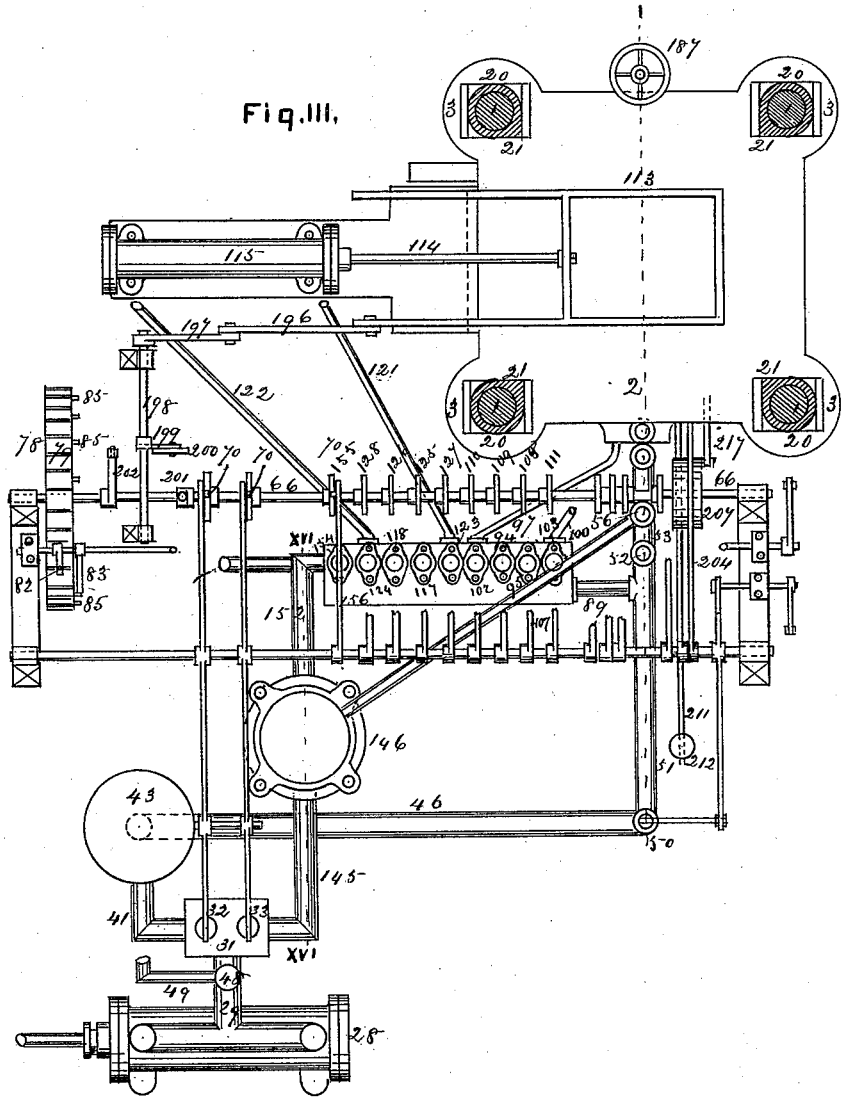
Fig. III.
ATTEST.
Geo. L. Wheelock
Samuel Knight
INVENTORS,
Julius J. Koch
Valentine Then
By Knight Bros.
Attys.

(No Model.) 8 Sheets—Sheet 3.
J. J. KOCH & V. THEN.
BRICK MACHINE.
No. 351,780. Patented Nov. 2, 1886.
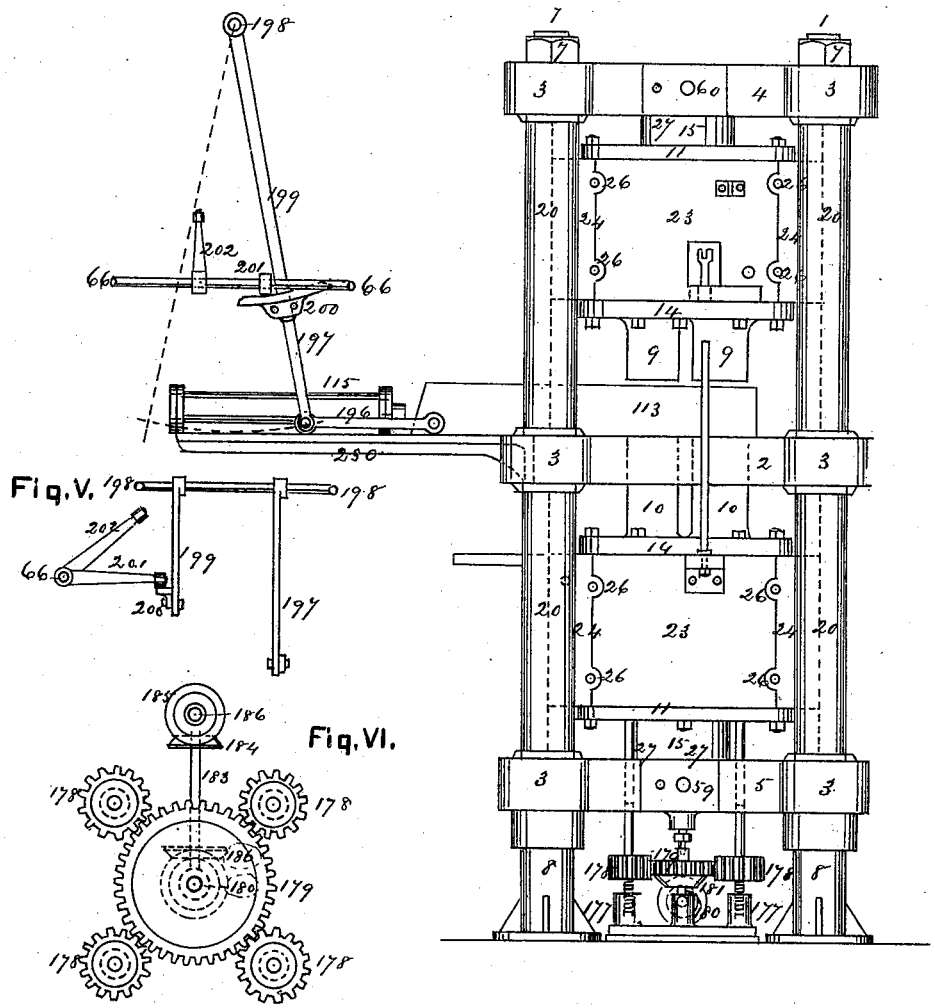
ATTEST,
Geo. L. Wheelock.
Samuel Knight.
INVENTORS,
Julius J. Koch
Valentine Then
By Knight Bro.
Attys

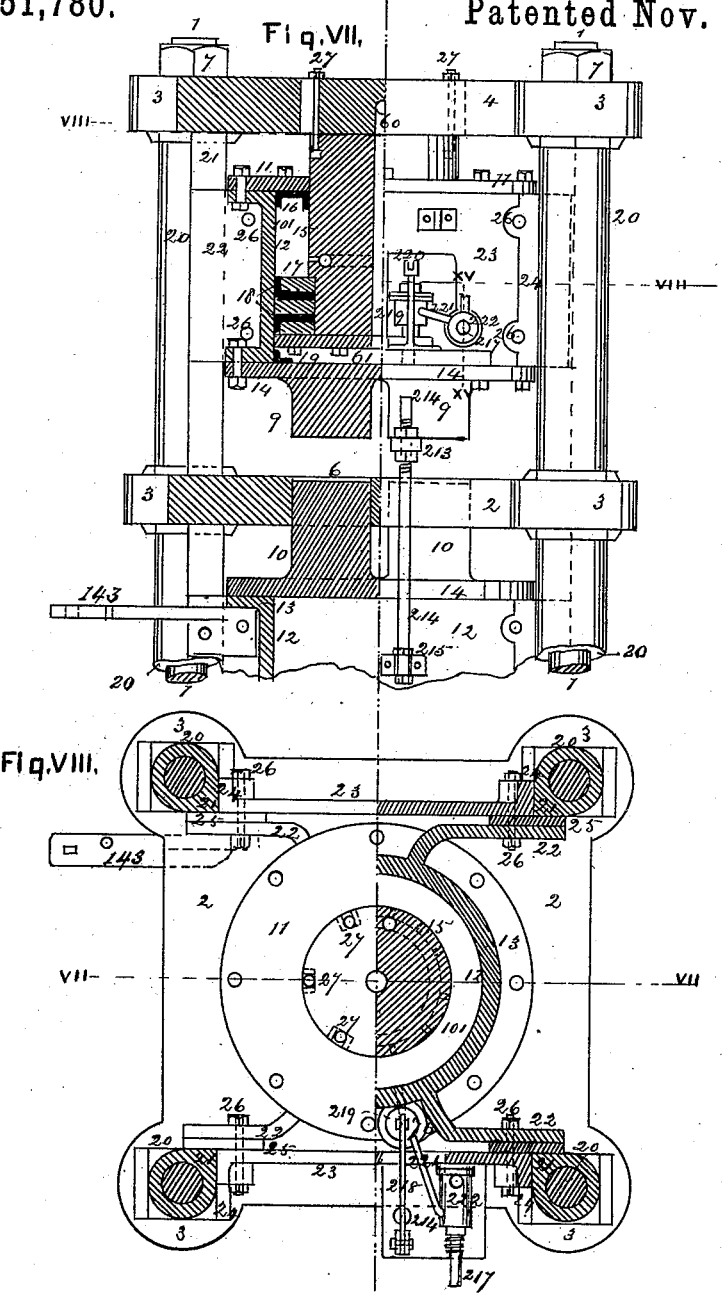

(No Model.) 8 Sheets—Sheet 5.
J. J. KOCH & V. THEN.
BRICK MACHINE.
No. 351,780. Patented Nov. 2, 1886.
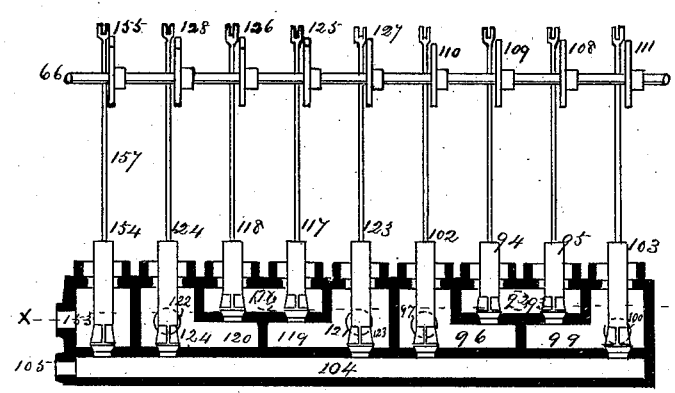
Fig. IX.
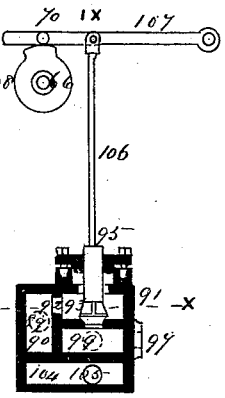
Fig. XI.
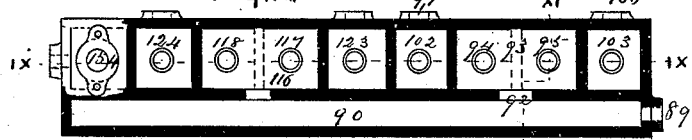
Fig. X.
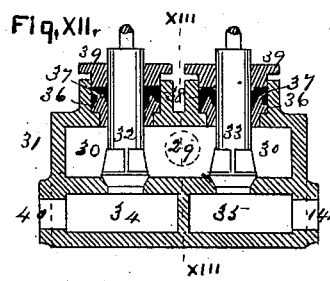
Fig. XII.
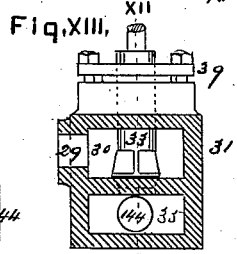
Fig. XIII.
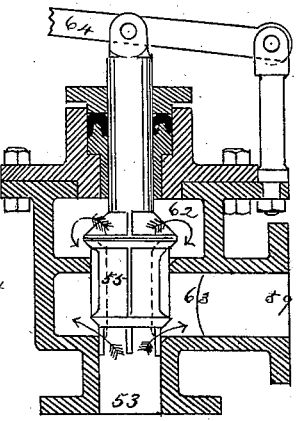
Fig. XIV.
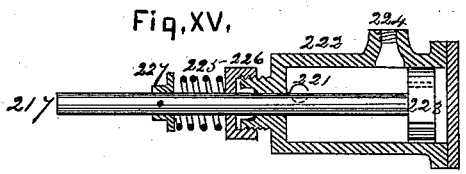
Fig. XV.
ATTEST.
Geo. L. Wheelock
Samuel H. Knight.
INVENTORS,
Julius J. Koch
Valentine Then
By Knight & Bro.
Attys (No Model.) 8 Sheets—Sheet 6.
J. J. KOCH & V. THEN.
BRICK MACHINE.
No. 351,780. Patented Nov. 2, 1886.
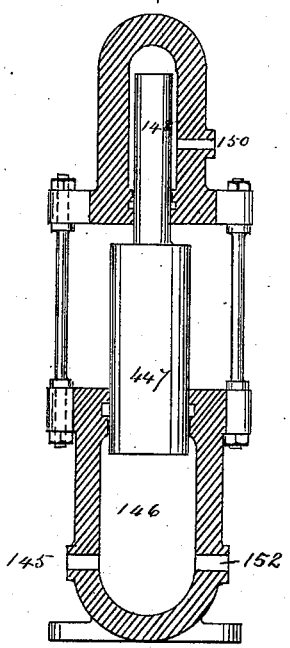
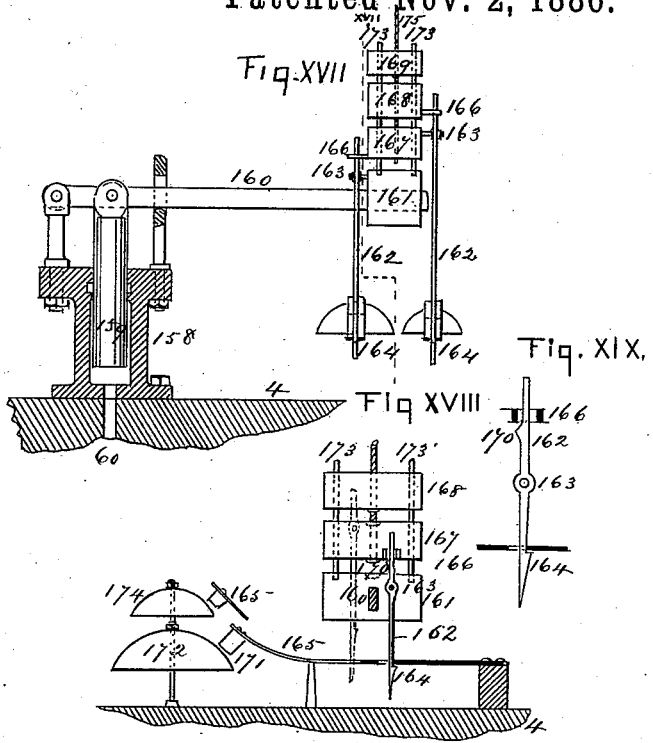
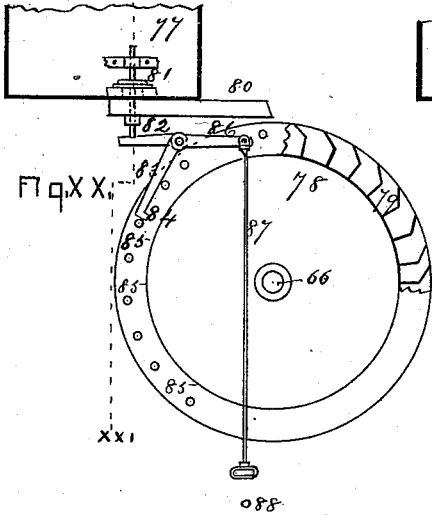
ATTEST:
Geo. L. Wheelock.
Samuel H. Knight.
INVENTORS:
Julius J. Koch
Valentine Then
By Knight Bros.
Attys (No Model.) 8 Sheets—Sheet 7.
J. J. KOCH & V. THEN.
BRICK MACHINE.
No. 351,780. Patented Nov. 2, 1886.
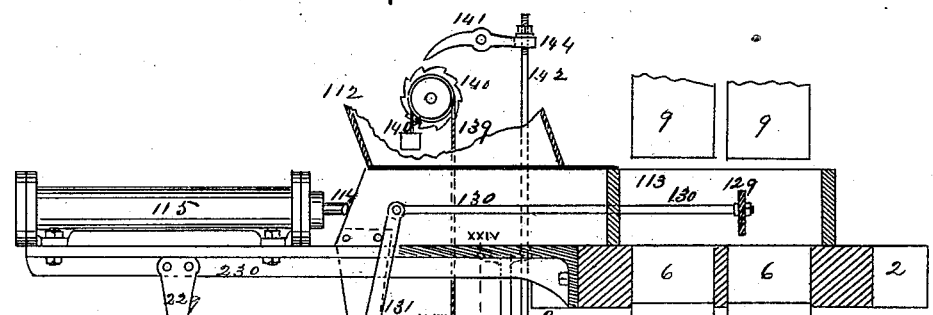
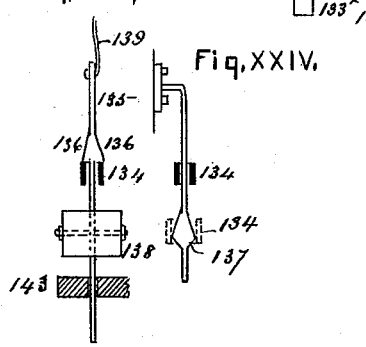
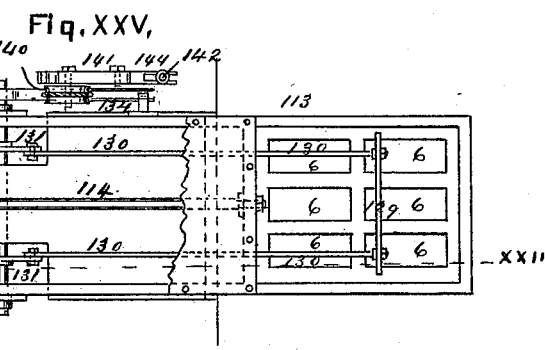
ATTEST  
Geo. L. Wheelock  
Samuel H. Knight
INVENTORS,  
Julius J. Koch  
Valentine Then  
By Knight Bro.  
Attys (No Model.) 8 Sheets—Sheet 8.
J. J. KOCH & V. THEN.
BRICK MACHINE.
No. 351,780. Patented Nov. 2, 1886.
FIG. XXVI.
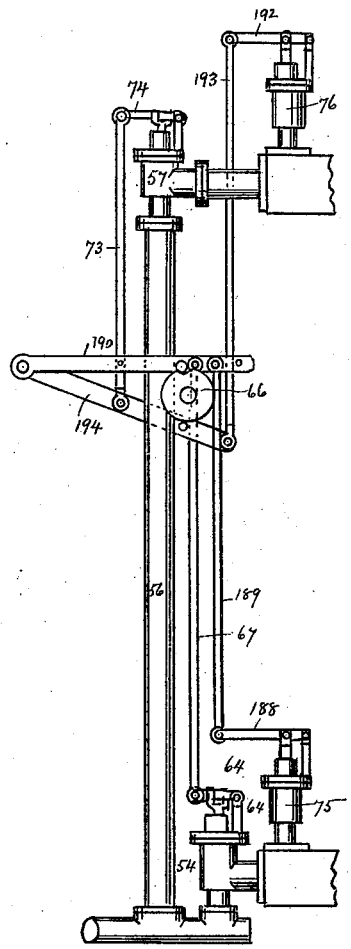
FIG. XXVII.
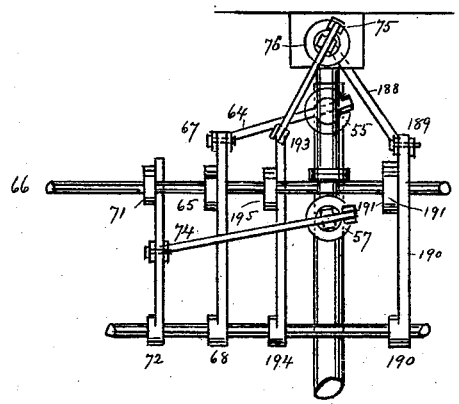

UNITED STATES PATENT OFFICE.

JULIUS J. KOCH AND VALENTINE THEN, OF ST. LOUIS, MISSOURI.

BRICK-MACHINE.

SPECIFICATION forming part of Letters Patent No. 351,780, dated November 2, 1886.

Application filed August 3, 1885. Serial No. 173,432. (No model.)

*To all whom it may concern:*

Be it known that we, JULIUS J. KOCH and VALENTINE THEN, of the city of St. Louis, in the State of Missouri, have invented a certain new and useful Improvement in Brick-Machines, of which the following is a full, clear, and exact description, reference being had to the accompanying drawings, forming part of this specification.

This invention belongs to that class of brick-machines in which the bricks are compressed in a fixed mold by direct hydraulic pressure upon the dies. The movements are in the main governed by means of valves operated by cams upon a single shaft.

Figure I is a vertical section at I I, Fig. III. Fig. II is an enlarged vertical section at II II, Fig. I. Fig. III is part in horizontal section at III III, Fig. I, and part in plan, parts of the cam-levers being broken away to avoid confusion. Fig. IV is a detail elevation of the die-cylinders and main frame. Fig. V is a detail elevation of the charger-escapement, looking from the main frame. Fig. VI is a plan of the mechanism by which the descent of the lower die-cylinder is adjusted. Fig. VII is part in vertical section at VII VII, Fig. VIII, and part in elevation, showing the upper die-cylinder and adjacent parts. Fig. VIII is a horizontal section at VIII VIII, Fig. VII. Fig. IX is a vertical section at IX IX, Fig. X. Fig. X is a horizontal section at X X, Figs. IX and XI. Fig. XI is a vertical section at XI XI, Fig. X. Fig. XII is a vertical section at XII XII, Fig. XIII. Fig. XIII is a vertical section at XIII XIII, Fig. XII. Fig. XIV is an enlarged axial section of the inlet and exhaust valves of the main areas of the die-cylinders. Fig. XV is an enlarged detail vertical section at XV XV, Fig. VII. Fig. XVI is an enlarged axial section of the multiplier at XVI XVI, Fig. III. Fig. XVII is an enlarged view of the alarm device, partly in elevation and partly in vertical section. Fig. XVIII is a vertical section at XVIII XVIII, Fig. XVII. Fig. XIX is an enlarged detail of one of the trip-rods of the alarm mechanism. Fig. XX is a vertical section at XX XX, Fig. XXI, with part of the water-wheel broken out to show the buckets. Fig. XXI is a vertical section at XXI XXI, Fig. XX. Fig. XXII is a vertical section at XXII XXII, Fig. XXV. Fig. XXIII is a vertical section at XXIII XXIII, Fig. XXII. Fig. XXIV is a vertical section at XXIV XXIV, Fig. XXII. Fig. XXV is a top view of the charger and its actuating-cylinder. Figs. XXVI and XXVII are, respectively, a side elevation and a plan of details, hereinafter referred to.

The main frame of the machine has four upright tie-rods, 1, of considerable strength, supporting at about their middle, by means of sleeves upon the rods, the mold-plate 2, and at their ends passing through eyes 3 at the four corners of the mold-plate, head-plate 4, and foot-plate 5. The ends of the tie-rods are screw-threaded, and upon them turn nuts, by which the head and foot plates are held upon the rods as the pressure is brought upon the clay in the molds 6. The upper nuts are shown at 7, Fig. I; but the lower nuts are within the recess at the upper ends of the shoes or standards 8, upon which the main frame is supported, there being one bearing-shoe at each corner. The shoes or standards rest, of course, upon sufficient base or foundation.

The upper dies, 9, and the lower dies, 10, are upon the heads of similar cylinders, which move on fixed or stationary plungers, said cylinders and plungers being formed alike at top and bottom, so that description applies equally to either. Each cylinder has a solid head, 14, carrying the dies (9 or 10) and a body, 12, cast open at both sides and with outturned flanges 13, to which the heads 11 and 14 are firmly bolted, Figs. I and VII. The head 11 has a central orifice for the passage of the stem or body 15 of the piston, which is firmly fixed to the plates 4 or 5, as the case may be. The joints between the head 14 of the cylinder and the cylinder-body and plunger-stem are made tight by an annular U-packing, 16, Fig. I, so as to prevent the escape of the water or other liquid with which the machine is driven. The head 17 of each plunger has double "cup" packing 18, by which the water is prevented from passing either upward or downward, the pressure of water being alternately below and above the head. There is L-packing 19 at the junction of the head 14 and the body 12 of the cylinder, Fig. I.

Upon the tie-rods 1 are sleeves 20, extending from the mold-plates 2 to the plates 4 and 5. These sleeves are cylindrical, except that upon the inner side of each is a rectangular rib or corner, 21, extending from top to bottom of the sleeve, Fig. VIII. These ribs form guides for the mold-cylinders as they move upward and downward.

22 are guide-wings cast upon each cylinder, (see Fig. VIII,) which extend between the sleeves.

23 are guide-plates, which extend from one of the sleeves 20 to another, and which have flanges 24, fitting snugly against one face of the rib 21.

25 is a filling-plate, which fits the other face of the rib 21 and which fills the space between the wing 22 and said face, and between said wing and the guide-plate 23. At each corner the wing 22 and plates 23 and 25 are secured together by bolts 26, Fig. VIII. Thus the cylinders are accurately guided, and the parts can be readily disconnected for the removal of the cylinders. The construction allows the cylinders to be put in place after the main frame is erected, as may be readily seen by examination of Fig. VIII, for if the bolts 26 and filling-plates 25 are removed the cylinders can be moved out bodily upon either side.

At 27 are shown the bolts by which the two plungers 15 are connected to the plates 4 and 5, the bolts passing through the plates and having bearing in T-shaped recesses in the sides of the piston. (See Figs. I, IV, and VII.)

28 is a force-pump, which may have any suitable construction and in which no novelty is claimed. The pump has continuous motion while the brick-machine is in operation and discharges through a pipe, 29, into the chamber 30 of a valve-chest, 31, having two valves, 32 and 33, seated in the bottom of the chamber 30. The ports of these valves communicate, respectively, with chambers 34 35. (See Fig. XII.) The valve-chest is made with orifices of sufficient size to allow the valves 32 33 to be dropped from above into place upon their seats, after which bushings 36 are dropped into the annular space surrounding the valve-stem. The bushing has an annular rib, 37, upon its top, which occupies the concave side of the annular U-packing 38, by which the escape of water is prevented. 39 is a gland or follower by which the packing 38 is held down.

The chamber 34 has an orifice, 40, in communication through a pipe, 41, with the air-vessel 42, so that when the valve 32 is open the water may be forced into the air-vessel. Above the air-vessel is another air-vessel, 43, in communication with the former by a pipe, 44, having in it a three-way cock, 45, and a side nozzle, 44ᵃ, by which either or both of the air-vessels may be thrown into communication with one another, Figs. I, II, and III.

The purpose of this construction is to enable the filling of the air-vessel 42 with air under high degree of pressure, as required, and this is done in the following manner: The air-chambers being in communication with each other and shut off from the atmosphere, water is forced into the main air-chamber 42 by the pump driving the air into the chamber 43. The valve 32 is then closed and the cock 45 turned so as to close communication between the two air-chambers and throw the main air-chamber into communication with the atmosphere. The water is then allowed to escape from the air-vessel 42 by opening a cock, 47, in the pipe 46, extending from the lower part of the air-vessel.

The pressure in the air-vessel is very great, and it is found in practice that the air escapes in the water, and that in time the air-space becomes so small as to interfere with the efficient working of the machine. Our supplemental vessel 43 enables us to keep in reserve a quantity of air under very high pressure, and by means of the cock 45 some of this air may be allowed to escape into the main vessel to compensate for the air which has escaped by mixture with the water.

48 is a safety-valve, by which the water is allowed to escape from the discharge-pipe 29 of the force-pump when it attains a certain pressure.

49 is the discharge-pipe of the safety-valve, Figs. I and III.

50 is a valve interposed between the pipe 46 and the pipe 51, in whose vertical part is a check-valve, 52, which allows the water to flow upward, but prevents its backward flow.

53 is a horizontal pipe extending from the check-valve and leading to the chamber 54 of valve 55 and the upright water-pipe 56, which communicates with the chamber 57 of a valve similar to the valve 55, Fig. I. By the opening of the valve 55 the water is allowed to enter the main space 58 of the lower die-cylinder through a passage, 59, extending through plate 5 and plunger 15. In like manner, when valve within the chamber 57 is opened, the water flows through a passage, 60, into the main space 61 of upper die-cylinder.

An enlarged view of valve 55 is shown in Fig. XIV, valve 57 being of similar construction. The valve is a double-seated puppet-valve, and made hollow for the water to pass freely from pipe 53 to chamber 62, so that the valve is nearly balanced. 63 is the eduction-chamber, with which both pipe 53 and chamber 62 communicate, as shown by the arrows, when the valve is raised from its seats. The stem of the valve has a similar packing to that described in case of valves 32 and 33. In fact, all of the puppet-valves in the machine may have similar stem-packing.

The valve 55 is lifted by a lever, 64, by means of a cam, 65, upon shaft 66, the lever for this purpose being connected by a rod, 67, to cam-lever 68. (See Figs. XXVI and XXVII.) This lever 68 and all cam-levers actuated by cams on shaft 66 are fulcrumed on a rod, 69. The levers have laterally-projecting pins armed with anti-friction rollers 70, against which the cams act in lifting the levers. The valve 57 is opened by a cam, 71, on shaft 66, said cam acting on a lever, 72, connected by a rod, 73, to lever 74 of the valve. The passages 59 and 60 are in connection with outlet-valves 75 and 76, respectively.

The water from valve 75 may run back into the pump-reservoir; but valve 76 discharges into a tank, 77, which supplies water to water-wheel 78, by which cam-shaft 66 is turned. This water-wheel has at its circumference buckets 79, into which the water flows from a spout, 80, in which is a valve, 81, by which the spout is closed when the machine is not running. The lower end of the valve-stem bears on arm 82 of a three-armed lever, whose arm 83 has a hook, 84, engaging, when the valve is down, one of a series of pins, 85, upon the water-wheel. To arm 86 of the lever is hung a rod, 87, by whose downward movement the valve is raised. 88 is a pin on which the handle of rod 87 may be engaged to keep the valve open. (See Fig. XX.) 89 is a pipe extending from the pipe 51 to chamber 90 of valve-chest 91. (See Figs. I, III, IV, X, and XI.) The chamber 90 is in communication through orifice 92 with chamber 93, in whose bottom are seated two valves, 94 and 95. The port of valve 94 leads into a chamber, 96, having a connection by a pipe, 97, with the annular space 98 of the lower die-cylinder, while port of valve 95 leads into a chamber, 99, connected by a pipe, 100, with annular space 101 of the upper die-cylinder. In chambers 96 and 99 are valves 102 and 103, seated in bottoms of their chambers, and whose ports lead into exhaust-chamber 104, discharging through an orifice, 105. The arrangement is such that when valves 94 and 95 are open the water flows into the annular spaces of die-cylinders and moves the dies away from molds, whereas when valves 102 103 are open the water may flow from the annular spaces through exhaust-orifice 105, back into the reservoir from which the force-pump draws its supply, Figs. I, III, and IX.

The valves are all operated in a similar manner, as illustrated in Fig. XI in relation to valve 95, the valve-stem having a rod, 106, connected to lever 107, acted on by cam 108 on shaft 66. The valves (being balanced) fall by their gravity and by pressure of water when released from the action of the cams. The cams will, however, be indicated by different numbers to identify them. Valve 94 is raised by cam 109, valve 102 by cam 110, valve 103 by cam 111, Fig. IX.

112, Fig. XXII, is the hopper containing the clay, and 113 is charger by which the clay is carried to molds. The charger has a rod, 114, upon whose end is a piston working in a hydraulic cylinder, 115. This construction is not new, and no claim is made to same. The water to work piston passes through valve-chest 91, passing from chamber 90 into chamber 116, in which work two valves, 117 and 118, the valve-ports being in bottom of chamber 116, and communicating with chambers 119 and 120. The chamber 119 communicates by a pipe, 121, with one end of cylinder 115, and chamber 120 through pipe 122 with the other end of cylinder.

123 and 124 are exhaust-valves working in chambers 119 and 120, and which, when open, permit the water to escape from chambers into the exhaust-chamber 104. The construction is such that when valves 118 and 123 are open the charger moves forward, and when valves 117 and 124 are open the charger moves backward. The valve 117 is raised by cam 125, valve 118 by cam 126, valve 123 by cam 127, and valve 124 by cam 128.

129 is a clay-distributer working within the charger. This consists of an upright plate extending crosswise of charger. From this plate extend two rods, 130, working through rear side of charger. These rods are connected to arms 131 of rock-shaft 132, having upon it arms 133 and 134. The rock-shaft is supported in brackets on charger-frame. Arm 133 carries a weight, $133^\times$, on its end. Arm 134 is composed of two parallel spring-bars, through which works a vertical weighted bar, 135. This vertical bar has upon its sides inclined projections 136, which engage the spring-bars, (composing arm 134,) and arm 134 is carried downward with weighted bar until the arm reaches a wedge-formed spreader, 137, and spring-bars are spread apart, allowing projections 136 to pass between them, Figs. XXII, XXIII, XXIV, XXV. The bar 135 carries a weight, 138, and is suspended on cord 139, coiled around pulley 140, and carries at its end weight $140^\times$, whose office is to turn the pulley backward, when bar 135 is lifted by means which will be described.

Upon pulley 140 are ratchet-teeth that are engaged by a dog, 141, the construction being such that the bar 135 is held in its elevated position by the dog until the lower dies reach their lower position, at which time the point of dog is raised by rod 142, whose lower end is secured to an arm, 143, extending from die-cylinder, and whose upper end works in a slot on arm 144 of dog. Bar 135 works in a mortise of arm 143, as seen in Figs. XXII and XXIII, and the descent of bar is arrested by weight 138, coming in contact with arm 143.

The operation of these parts is as follows, supposing them to be in position shown in Fig. XXII: When the die-cylinder rises, arm 143 carries up bar 135. Projections 136 pass between spring-bars composing arm 134, springing them apart as they pass between. At same time weight $140^\times$ turns ratchet-pulley 140 backward, the dog prevents the pulley being turned in opposite direction, and so weighted bar 135 is sustained and remains in upper position, as seen in dotted lines in Fig. XXII, until die-cylinder reaches its lower position, when point of dog is disengaged from ratchet-teeth, weighted bar descends and carries down arm 134, and throws the distributer forward with a rapid jerk into position shown in Fig. XXII. The chamber 35 of valve-chest 31 has a discharge-orifice, 144, in connection with pipe 145, leading from chamber to low-pressure cylinder 146 of multiplier. In this cylinder works the larger member, 147, of plunger.

In the other cylinder is an orifice, 150, connected by pipe 151 with the upright water-pipe 56. (See Figs. I and XVI.) The low-pressure cylinder is connected by a pipe, 152, with the chamber 153 of the valve 154, which is an exhaust-valve port, and communicates with the exhaust-chamber 104, so that when the valve 154 is open the water may escape from the low-pressure cylinder. The valve 154 is lifted by the cam 155 on the shaft 66 by means of lever 156 and rod 157, and closed by water-pressure on top of valves and appurtenances.

158 is the cylinder of an alarm device, the interior of the chamber being in communication with the passage 60. Within the cylinder is a plunger, 159, connected to a lever, 160, carrying a weight, 161, the arrangement being such that when the water-pressure exceeds a given amount the weight shall be lifted.

162 is a catch-rod hanging from a pivot, 163, upon the weight 161, (see Figs. XVII, XVIII, XIX,) and having a catch, 164, which passes through an orifice or engaging in the notch in the spring 165. The upper end of the rod 162 passes through an eye, 166, at the side of the weight 167. At the side of the rod is an inclined projection, 170, which, as the rod rises, comes in contact with the side of the eye and swings the rod upon its pivot, so as to disengage the catch 164 from the spring, thus releasing the spring from the catch and allowing it to spring downward, bringing the hammer 171 on the spring in contact with the bell 172 to sound an alarm. The alarm indicates that there is a little too much clay fed into the molds, and consequently the given pressure has been attained before the bricks have been reduced to the given thickness. This results from the feeding of too large a quantity of clay to the molds.

Extending upward from the weight 161 are guide-rods 173, which pass through holes bored in the weights 167, 168, and 169, the guide-rods moving easily in the bores, and serving to hold the weights in a vertical series, while allowing independent vertical movement. The weights above 161 are suspended upon a cord, 175, a space being left between each two of the weights, so that as the weight 161 ascends the weight of the second weight, 167, is first added to it and the ascent of the lever 160 is checked. Then if the pressure of the water overcomes both weights they move up together, and the second bell, 174, is sounded by a device connected with the weight 167, similar in all respects to that described in connection with the weight 161, and thus if the pressure still increases, and one weight after another is imposed upon the lever 160, one bell after another is sounded. The bells are made to have different sounds, so that the degree of urgency of the warning shall be indicated by the increased sharpness or other difference in the sounds, Figs. I, XVII, XVIII, XIX.

In order to regulate the amount of clay fed to the molds, a device is provided to limit the descent of the under dies, 10. This device has a number of rods, 176, upon whose upper ends the lower die-cylinder descends. The lower ends of these rods are screw-threaded and work in fixed nuts or screw-threaded sockets 177.

Upon each rod is a spur-pinion, which engages with a central spur-wheel, 179, turning on bearings 180. Upon the wheel 179 or the shaft of the same is a bevel-wheel, 181, engaged by a similar wheel, 182, upon a shaft, 183, which carries a bevel-wheel, 184, engaged by a bevel-wheel, 185, upon a shaft, 186, turned by a hand-wheel, 187, to simultaneously raise or lower all of the rods 176, Figs. I, IV, VI. The rods 176 have bearings in the plate 5 of the machine.

It will be understood that the lower dies constitute the bottoms of the molds when the molds are being charged. There is nothing new in the regulation of the amount of clay in the molds by adjusting the position of the lower dies. Only the means for accomplishing the adjustment are claimed to be novel. The exhaust-valve 75 of the main space of the lower die-cylinder is lifted by a lever, 188, connected by a rod, 189, with the cam-lever 190, which at the proper time is lifted by the cam 191. (See Figs. I and III.) The exhaust-valve 76 of the main space of the upper die-cylinder is lifted by a lever, 192, rod 193, cam-lever 194, and cam 195, Figs. XXVI and XXVII.

196, Figs. IV and V, is a link by which the charger is connected to the arm 197 of a rock-shaft, 198, which carries a detent-arm, 199, having upon it a ledge, 200. Upon the cam-shaft 66 are two arms, 201 and 202, which the rotation of the cam-shaft brings in contact with the top of the ledge in the two positions of the charger. In Figs. IV and V the arm 201 is shown in contact with the ledge. The ledge 200 is in the course of the arm 201 when the charger is in its forward position, and in the course of the arm 202 when the charger is in its rearward position, Figs. I, IV, V.

203 is an arm extending from the upper die-cylinder, which lifts the end of the detent-arm 204 when the cylinder is just reaching its upper position, and carries the tooth 205 of the arm out of a notch, 206, of the wheel 207, which is fast upon the cam-shaft.

In explaining the working of the press, we will suppose that a batch of bricks has just been pressed, and that they have been lifted from the molds by the upward movement of the lower dies, whose tops are not flush with the tops of the molds, the charger being in its rear position beneath the hopper and filled with clay. The upper dies are just moving up to their highest position, and, before stopping, the arm 203 lifts the lever 204. The cam-shaft 66 being released, rotates (by action of the water-wheel) until the arm 202 comes in contact with the ledge 200. This movement of the cam-shaft has caused the closing of the inlet-valve 95, and the opening of the inlet-valve 118 and the exhaust-valve 123. This causes the charger to move forward, pushing the bricks from the top of the mold-plate. Before the charger reaches its advanced position the ledge 200 is drawn from beneath the arm 202, and the cam-shaft 66 makes a part rotation, and is stopped by the tooth 208 on lever 209, the said tooth entering the notch or recess 210 in the wheel 207. The tail 211 of the lever 209 carries a weight, 212, by which the other end of the lever is elevated to carry the tooth 208 into the recess 210, Fig. I. The last motion of the cam-shaft 66 closes the valve and opens the inlet-valve 94 of the annular space of the lower die-cylinder, and opens also the exhaust-valve 75. The lower die-cylinder then descends, and the clay follows the dies into the molds. Before the lower die-cylinder comes to its lowest position the latch 213, fastened to said cylinder by a rod, 214, and arm 215, comes in contact with the lever 209, and draws the tooth 208 from the notch or recess 210, and the cam-shaft again turns until stopped by the arm 201 falling on the ledge 200. This last motion of the cam-shaft 66 closes first the inlet-valve 94 of the annular space of the lower die-cylinder and opens the inlet-valve 117 of the charger-cylinder and the exhaust-valve 124 of the same and the charger moves backward. Before the charger comes to its rear position the ledge 200 is moved from beneath the lever 201, and the cam-shaft 66 makes another part rotation until arrested by the shoulder 216 coming in contact with the rod 217, Fig. I. This last movement of the cam-shaft closes the inlet-valve 117, and the charger stops under the hopper. The motion of the cam-shaft also causes the opening of the exhaust-valve 103, for the annular space of the upper die-cylinder and the inlet-valve 57 is also opened, valve 76 being closed. The upper die-cylinder then descends upon the clay in the molds, and during its descent the cam-shaft continues to turn slowly as the rod 217 moves with the cylinder. As soon as the upper dies are on the clay, the valve 55 is opened by the cam on shaft 66, exhaust-valves 75 and 76 being closed, the exhaust-valves of the annular spaces of the die-cylinders being opened. The water-pressure is in both main spaces (58 and 61) of the die-cylinders, and forces them toward each other upon the clay. The pressure of the water is not great enough to give the required density, and is increased by the action of the multiplier. To put this in operation, the valve 32 is closed and the valve 33 opened, Figs. III and XII, and the water is forced into the larger cylinder, 146, of the multiplier, Figs. I, III, XIV, and the water is forced out of the upper cylinder by the action of the smaller plunger, 148, and the pressure of the water is rapidly increased. When the bricks are reduced to the required thickness, then the rod 217, Fig. I, touches the lever 218 and the valve 219 is opened. This valve is similar to valves 55, 57, 75, and 76. Valve 219 is opened quickly, the lever 218 being long and the rod 214 impinging against it near the fulcrum 220. When the valve 219 is opened, the water rushes from chamber 61 of the upper die-cylinder with great velocity through pipe 221, Fig. VII, into the small cylinder 222, and drives the piston 223 back with the rod 217, Fig. XV. The water exhausts from the cylinder 222 through a small hole, 224, to which is connected a waste-hose at 224, Fig. VII. The rod 217 is surrounded by a spiral spring, 225, which bears at its ends against the stuffing-box 226, and a collar, 227, on the rod, so as to project the rod as soon as the water-pressure is removed from the piston 223. When the rod 217 is forced back, it is out of the course of the projection 216, and the cam-shaft 66 is released, so that it rotates until it is stopped by the tooth 205 upon lever 204. Before, however, the cam-shaft is stopped the following valves are operated by the cams upon it: Valve 33 is closed and valve 32 opened, Fig. III, and the exhaust-valve 154, Fig. IX, of the multiplier opened. When this is done, the double plunger 147 148 of the multiplier descends by the pressure of water and gravity. The rotation of the cam-shaft 66 also enables the valve 57 to close, and opens the valve 76. The inlet-valve 94 of the annular space of the upper die-cylinder is opened, the low-water pressure continuing on the lower die-cylinder. Both cylinders move upward, the lower dies stopping when level with the top of the mold-frame or plate, and lifting the bricks out of the molds. The upper die-cylinder continues to move upward, to make way for the charger, and lifts the lever 204 upward, as before described, and the operation is repeated. It will be understood that during the pressing of one set of bricks the cam-shaft makes a single rotation. As the charger moves backward, the inclined end of the arm 133 passes under the roller 228, which has bearing in the hanger 229, fixed to the charger-guides 230.

We claim—

1. In a brick-machine, the combination, with an open charger, of an independently-movable distributer supported within said charger, substantially as set forth.

2. In a brick-machine, the combination, with a charger open at top and bottom, of the distributing-bar 129, rods 130, supporting it within the charger, rock-shaft 132, having arm 131, to which said rods 130 are connected, and arm 134, operated by the movement of the die-cylinder, substantially as set forth.

3. The combination of the charger 113, bar 129, rods 130, arms 131 and 134, rock-shaft 132, a weighted bar, 135, passing between springs of the arm 134, and suspended on a cord coiled on the ratchet-wheel 140, and a dog, 141, released from the ratchet-wheel by the movement of the die-cylinder, for the purpose set forth.

4. The combination of the charger 113, bar 129, rods 130, arm 131, arm 134, composed of parallel springs, arm 133, roller 228, weighted bar 135, with suspending-cord 139, coiled on ratchet-wheel 140, and dog engaging the teeth of the ratchet-wheel and released therefrom by connection with the lower die-cylinder.

5. In a brick-machine, the combination, with a fixed plunger having an enlarged piston-head and a cylinder surrounding said piston-head and plunger, whereby a chamber is formed upon each side of said head, of ducts or passages through said plunger communicating with both chambers, and valves for controlling the ingress and egress of fluid to and from each of said chambers, substantially as set forth.

6. In a brick-machine, the combination, with a piston having a fixed plunger, of a cylinder consisting of a body open at both ends, a perforated head surrounding the plunger, and a head having the dies, substantially as set forth.

7. In a brick-machine, the combination, with the corner-standards and a movable cylinder carrying the dies, of the guide-wings projecting from said cylinder and bearing against said corner-standards, substantially as set forth.

8. The combination of cylinder-body 12, guide 22, guide-plate 23, and removable distance-piece 25, substantially as and for the purpose set forth.

9. The combination of a die-cylinder working on a fixed plunger, the said plunger having a head, as 17, separating the cylinder-space into two chambers, one having whole cylinder-area and the other of which is an annular chamber surrounding the body of the plunger.

10. The combination, with the hydraulic die-cylinder of a brick-press, of an eduction-passage from the water-chamber of the cylinder, and a device on the other die-cylinder of the press opening said valve when the cylinders have gained a given proximity.

11. An eduction-passage from the water-chamber of a hydraulic cylinder of a brick-machine, an upright cylinder with whose interior the eduction-passage communicates, a plunger working water-tight in said cylinder and connected to a weighted lever, and an alarm-bell which is sounded on the upward movement of the plunger.

12. The combination of a plunger working in an upright cylinder and connected to a weighted lever, bell-hammers actuated by said lever in its upward movement, and a series of weights taken up one after another by the lever in its ascent.

13. A cylinder, a plunger working in water-tight packing of the cylinder and connected to a weighted lever, with a series of weights supported in the ascending course of the lever, so as to be taken up one after another and by the lever as it ascends, and a catch-rod to each lever constructed to elevate and then release a bell-hammer as said weight ascends.

14. The combination, in a brick-machine, of a cam-shaft, operating-valves, and a water-wheel actuating said shaft when relieved from detents acting on wheel or arm on the cam-shaft.

15. In a brick-machine, the combination, with a cam-shaft and means for rotating it when not engaged, of a detent for engaging said shaft automatically actuated by the machine, whereby its rotation is alternately permitted and prevented at intervals, substantially as and for the purposes set forth.

16. The combination, with a shaft carrying valve-operating cams, of arms 201 and 202, and an arm oscillated with the movement of the charger and carrying a detent-ledge, 200, substantially as and for the purpose set forth.

JULIUS J. KOCH.
VALENTINE THEN.

Witnesses:
SAML. KNIGHT,
GEO. H. KNIGHT.